United States Patent
Schimpe

(10) Patent No.: US 10,498,479 B2
(45) Date of Patent: Dec. 3, 2019

(54) RECONFIGURABLE ADD/DROP MULTIPLEXING IN OPTICAL NETWORKS

(71) Applicant: Xieon Networks S.à.r.l., Senningerberg (LU)

(72) Inventor: Robert Schimpe, Riemerling (DE)

(73) Assignee: Xieon Networks S.à.r.l., Luxembourg (LU)

( * ) Notice: Subject to any disclaimer, the term of this patent is extended or adjusted under 35 U.S.C. 154(b) by 0 days.

(21) Appl. No.: 15/504,203

(22) PCT Filed: Aug. 18, 2015

(86) PCT No.: PCT/EP2015/068895
§ 371 (c)(1),
(2) Date: Feb. 15, 2017

(87) PCT Pub. No.: WO2016/030225
PCT Pub. Date: Mar. 3, 2016

(65) Prior Publication Data
US 2017/0279555 A1 Sep. 28, 2017

(30) Foreign Application Priority Data
Aug. 25, 2014 (EP) ..................................... 14182109

(51) Int. Cl.
*H04J 14/02* (2006.01)

(52) U.S. Cl.
CPC ........ *H04J 14/021* (2013.01); *H04J 14/0204* (2013.01); *H04J 14/0205* (2013.01);
(Continued)

(58) Field of Classification Search
CPC .. H04J 14/021; H04J 14/0204; H04J 14/0205; H04J 14/0212; H04J 14/0217; H04J 14/0294
(Continued)

(56) References Cited

U.S. PATENT DOCUMENTS 8,600,242 B2 * 12/2013 Ji ........................... H04B 10/60
398/203
9,520,959 B2 * 12/2016 Matsukawa ......... H04J 14/0212
(Continued)

FOREIGN PATENT DOCUMENTS

| EP | 2615755 A1 | 7/2013 |
| WO | 2011/044371 A1 | 4/2011 |

OTHER PUBLICATIONS

Garrich et al, Flexibility of Programmable Add Drop Architecture for ROADMs, Mar. 2014, OSA, All Document.*
(Continued)

*Primary Examiner* — Dibson J Sanchez
(74) *Attorney, Agent, or Firm* — Nelson Mullins Riley & Scarborough LLP

(57) ABSTRACT

The present invention relates to adding and dropping signals in a node of an optical network, wherein the node includes a reconfigurable optical add/drop multiplexer (ROADM). The reconfigurable optical add/drop multiplexer (ROADM) comprises output ports and at least one add port connectable to at least one line interface of the network and adapted to receive a modulated optical signal from the line interface. Selection units are connected to one of said add ports and adapted to forward the respective signals to a selected output terminal. A plurality of broadcast units is adapted to broadcast signals forwarded by the selection. Then a multiplexing and selecting device or apparatus selects and multiplexes the optical signals broadcast via broadcast unit output terminals into a plurality of wavelength-division multiplexing (WDM) optical signals and forwards the same to output ports of the reconfigurable optical add-drop multiplexer (ROADM).

11 Claims, 6 Drawing Sheets

Figure 1:
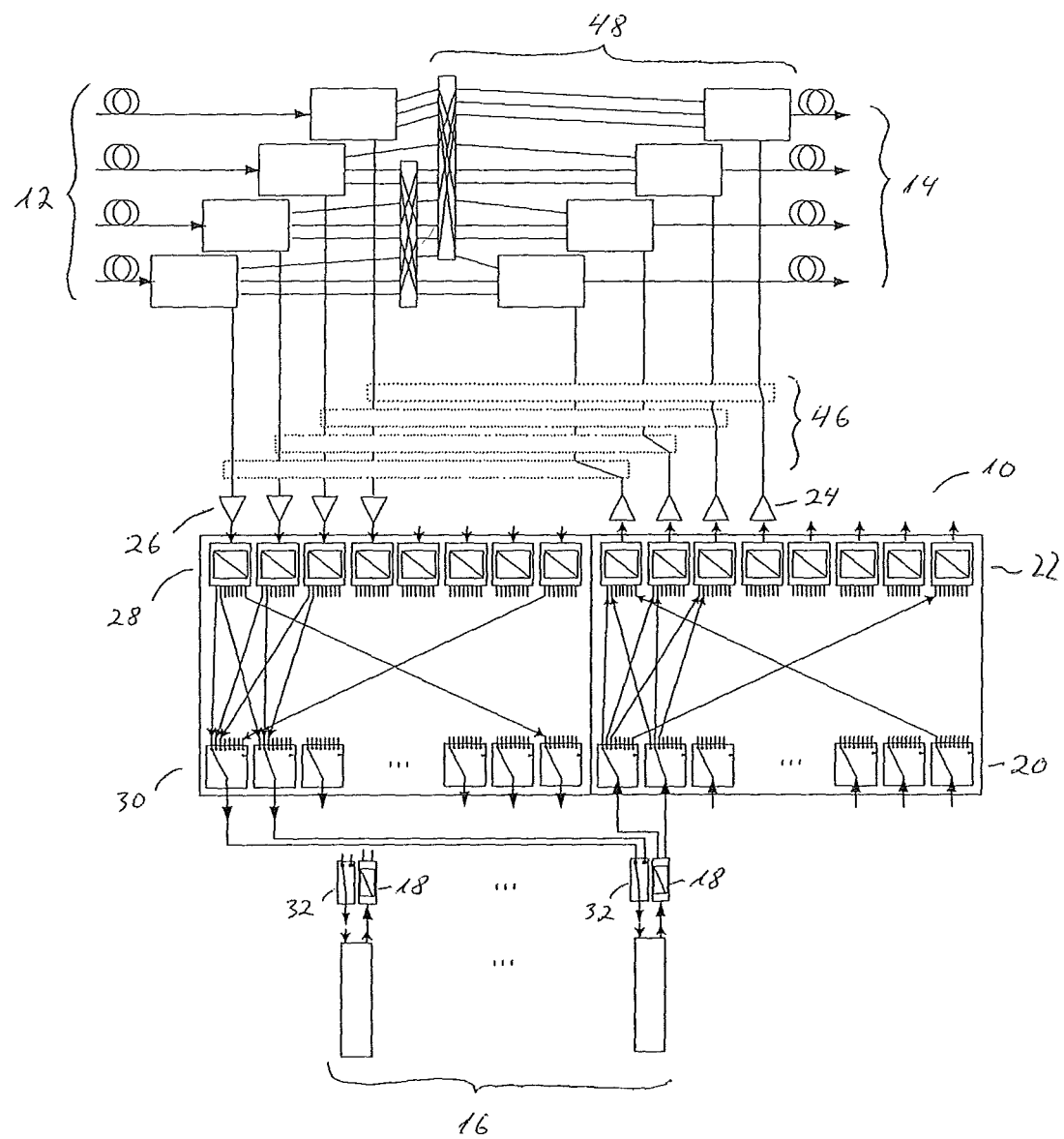

(52) U.S. Cl.
CPC ...... *H04J 14/0212* (2013.01); *H04J 14/0217* (2013.01); *H04J 14/0294* (2013.01)

(58) Field of Classification Search
USPC .................................................. 398/43–103
See application file for complete search history.

(56) References Cited

U.S. PATENT DOCUMENTS

| | | | | |
|---|---|---|---|---|
| 9,742,520 | B1* | 8/2017 | Way | H04J 14/0221 |
| 2001/0008450 | A1* | 7/2001 | Nakazawa | G02F 1/116 |
| | | | | 398/79 |
| 2006/0098981 | A1* | 5/2006 | Miura | H04J 14/0209 |
| | | | | 398/45 |
| 2008/0181605 | A1* | 7/2008 | Palacharla | H04J 14/0204 |
| | | | | 398/50 |
| 2009/0041457 | A1* | 2/2009 | Maki | H04J 14/0204 |
| | | | | 398/45 |
| 2009/0067845 | A1* | 3/2009 | Zhong | H04J 14/0204 |
| | | | | 398/83 |
| 2009/0232497 | A1 | 9/2009 | Archambault et al. | |
| 2010/0014863 | A1* | 1/2010 | Zami | H04J 14/0204 |
| | | | | 398/79 |
| 2011/0085801 | A1* | 4/2011 | Palacharla | H04J 14/0212 |
| | | | | 398/48 |
| 2011/0085803 | A1* | 4/2011 | Ji | H04J 14/0204 |
| | | | | 398/79 |
| 2011/0116790 | A1* | 5/2011 | Sakauchi | H04J 14/0204 |
| | | | | 398/5 |
| 2011/0164876 | A1* | 7/2011 | Fujita | H04J 14/0204 |
| | | | | 398/48 |
| 2011/0262143 | A1* | 10/2011 | Ji | H04J 14/0204 |
| | | | | 398/83 |
| 2011/0286746 | A1* | 11/2011 | Ji | H04J 14/0204 |
| | | | | 398/83 |
| 2012/0002964 | A1* | 1/2012 | Takatsu | H04J 14/0204 |
| | | | | 398/50 |
| 2013/0315602 | A1* | 11/2013 | Oguma | H04B 10/25 |
| | | | | 398/83 |
| 2013/0322868 | A1* | 12/2013 | Wellbrock | H04J 14/0209 |
| | | | | 398/16 |
| 2013/0330073 | A1* | 12/2013 | Sakamoto | H04B 10/07 |
| | | | | 398/38 |
| 2014/0023373 | A1* | 1/2014 | Tosaki | H04J 14/0204 |
| | | | | 398/83 |
| 2014/0029942 | A1* | 1/2014 | Sato | H04J 14/0204 |
| | | | | 398/48 |
| 2014/0161454 | A1* | 6/2014 | Roorda | H04J 14/0212 |
| | | | | 398/68 |
| 2014/0270760 | A1* | 9/2014 | Xu | H04Q 11/0005 |
| | | | | 398/45 |
| 2014/0294344 | A1* | 10/2014 | Fondeur | H04Q 11/0005 |
| | | | | 385/17 |
| 2015/0055952 | A1* | 2/2015 | Younce | H04J 14/0212 |
| | | | | 398/48 |
| 2015/0071633 | A1* | 3/2015 | Mehrvar | H04J 14/0212 |
| | | | | 398/49 |
| 2015/0098696 | A1* | 4/2015 | Ol | H04J 14/0221 |
| | | | | 398/38 |
| 2015/0208146 | A1* | 7/2015 | Younce | H04Q 11/0066 |
| | | | | 398/21 |
| 2015/0215687 | A1* | 7/2015 | Aono | H04J 14/00 |
| | | | | 398/48 |
| 2015/0256908 | A1* | 9/2015 | Zhu | H04L 45/62 |
| | | | | 398/85 |
| 2015/0333835 | A1* | 11/2015 | Matsukawa | H04B 10/60 |
| | | | | 398/48 |
| 2016/0099851 | A1* | 4/2016 | Archambault | H04J 14/0212 |
| | | | | 398/16 |
| 2016/0261350 | A1* | 9/2016 | Nakamura | H04B 10/572 |
| 2016/0320562 | A1* | 11/2016 | Komiya | H04J 14/0212 |
| 2017/0222747 | A1* | 8/2017 | Ban | H04J 14/021 |
| 2017/0250752 | A1* | 8/2017 | Yuki | H04B 10/07955 |
| 2017/0324504 | A1* | 11/2017 | Jenkins | H04J 14/0267 |
| 2017/0346591 | A1* | 11/2017 | Chedore | H04J 14/0212 |

OTHER PUBLICATIONS

Singal, WDM Optical Communication Networks Performance Comparison using different Fibers, May 2014, International Journal of Scientific & Engineering Research, All Document.*
Way et al, Wavelength Contention Free via Optical Bypass Within a Colorless and Directionless ROADM, Oct. 2013, J. Opt. Commun. NETW, All Document.*
Zami, High degree optical cross connect based on multicast switch, Mar. 2014, OFC, All Document.*
International Search Report, PCT/EP2015/068895, dated Oct. 22, 2015, 11 pages.
Gringeri S., et al., "Flexible Architectures for Optical Transport nodes and Networks," IEEE Communications Magazine, IEEE Service, pp. 40-50, Jul. 1, 2010.

* cited by examiner

RECONFIGURABLE ADD/DROP MULTIPLEXING IN OPTICAL NETWORKS

CROSS REFERENCE TO RELATED APPLICATIONS

This application is a 35 U.S.C. 371 national stage filing of International Application No. PCT/EP2015/068895, filed on Aug 18, 2015, which claims priority to European Patent Application No. 14182109.0 filed on Aug. 25, 2014. The contents of the aforementioned applications are hereby incorporated by reference in their entireties.

FIELD OF THE INVENTION

The present invention relates to adding and dropping signals in a node of an optical network, wherein the node includes a reconfigurable optical add/drop multiplexer (ROADM). In particular, the present invention relates to a reconfigurable optical add-drop multiplexer (ROADM) for managing optical signals in a wavelength-division multiplexing (WDM) network; and a method of managing signals in a reconfigurable optical add-drop multiplexer (ROADM).

BACKGROUND OF THE INVENTION

A node in an optical network may contain add-drop functionality in the form of a reconfigurable optical add/drop multiplexer (ROADM) device. The reconfigurable optical add/drop multiplexer (ROADM) may be arranged to connect optical fibers in the node such as to add or drop signals on any or all wavelengths carried by the optical fibers in a wavelength division multiplexing (WDM) communication system. This represents an important functionality for managing and reconfiguring data transfer in optical networks, in particular in order to effectively accommodate the increasingly growing bandwidth demands and increasingly unpredictably data traffic patterns in optical networks.

In view of this need, ROADMs have been widely studied and developed to increase the degree of flexibility for adding and dropping WDM channels. For example, multi-degree ROADM nodes have been introduced to allow service operators to route wavelengths between fibers crossing in a node in a number of directions. Colorless ROADMs allow transponders to receive and transmit signals on any wavelength employed by the ROADM. Directionless ROADMs allow transponders to receive signals originating from any input port and can forward signals to any output port. Contentionless ROADMs allow cross-connecting any wavelength channel between fibers, independent of other channels in use, as long as there is a free add/drop port and a free wavelength available on the respective fibers.

In other words, the provided flexibility of adding and dropping signals on WDM channels determines the scope of measures which are available for dynamically managing data traffic in optical networks in order to achieve an efficient or optimal allocation of network resources. Further, increased flexibility of adding and dropping signals on WDM channels can be applied to implement optical channel protection by transmitting data to a receiver via two redundant paths, namely a "working" path and a "protecting" path, respectively. Consequently, the "protecting" path provides a fallback position if for example a fiber used in the "working path" breaks. Similarly, "bridge and role" functionality can be implemented to securely transition a data transfer between optical fibers or transmission paths. For this purpose, the degree of flexibility of adding and dropping signals provided by the ROADM node must be sufficient to have a first channel signal transmission duplicated and additionally fed to a second channel. After establishing the signal transmission via both channels, the data transmission of the first channel can be shut down without risking interrupted connectivity.

FIG. 1 illustrates a conventional arrangement of the add/drop part of a reconfigurable optical add/drop multiplexer (ROADM) 10. Here, the reconfigurable optical add/drop multiplexer (ROADM) 10 offers optical channel protection by colorless, directionless and contentionless adding and dropping of channels on four incoming 12 and four outgoing fiber 14 connections. In this respect, connecting, selecting and multiplexing devices or apparatuses 46, 48 are arranged to connect the four incoming 12 and four outgoing fiber 14 connections to input and output amplifier stages 26, 24 of the reconfigurable optical add/drop multiplexer (ROADM) 10. The respective connecting, selecting and multiplexing devices or apparatuses 46, 48 are explained in further detail below in connection with FIGS. 5, 6 and 7. Eight optical line interfaces 16 are provided to add and drop signals at the node. The optical channel protection is provided by having signals to be added from the optical line interfaces 16 fed to a splitter 18 which duplicates the signal to a working path and a protection path, respectively. The duplicated signals are forwarded to switches 20 which in turn forward each of the signals to different combiner units 22. The respective arrangement consisting of switches 20 and combiner units 22 is sometimes denoted as aggregator switch. The different combiner units 22 combine signals for transmission via different channels or fibers and thus provide optical channel protection by transmission via separate working and protection paths. If required, amplifier stages 24 can be arranged as shown in FIG. 1 to amplify the combined signals prior to transmission via the outgoing fibers 14. Typically the signals are passing through a further amplifier before being sent out. In the drop direction, the signals arriving from the incoming fibers 12 are fed through an amplifier and demultiplexing or splitter unit directly or through amplifier stages 26 to splitters 28. FIG. 7 has illustrated for each incoming fiber 12 an amplifier and a subsequent splitter. The splitters 28 duplicate the signals and forward the same to a plurality of switches 30. Thus, each of the switches 30 receives a plurality of signals arriving from the incoming fibers 12 and is adapted to select one of these signals for further processing. The respective arrangement consisting of splitters 28 and switches 30 is sometimes denoted as multicast switch. The selected signal is then forwarded to a second switch 32 which is arranged to receive two selected signals from two switches 30. In this way, the drop direction arrangement is adapted to receive a signal via two paths, namely the "working" path and "protection" path, respectively. Then, the second switch 32 can select and forward the signal to be dropped via the "working" path or "protection" path, depending on the condition or requirements of the optical network. Thus, the signal selected by the second switch 32 is forwarded to the optical line interface 16 receiving the dropped signal.

It follows that optical channel protection is conventionally provided by a reconfigurable optical add/drop multiplexer (ROADM) 10 representing a complex arrangement including a large number of components. Consequently, a large number of components must be connected to optical line interfaces 16 by dedicated cabling via splitters 18 and switches 32. Thus, the conventional arrangement of a reconfigurable optical add/drop multiplexer (ROADM) 10 has the disadvantages that the large number of components require high cost of manufacturing and the device is subject to cumbersome installation cabling. Moreover, implementing and using a large number of components results in a system which is more prone to malfunction due to component failure.

Depending on the desired functionality of the optical channel protection, each of the optical line interfaces 16 must be connected accordingly during the installation process of the reconfigurable optical add/drop multiplexer (ROADM) 10. In particular, the optical line interfaces 16 must be connected to respective switches 20 and second switches 30 via splitters 18 and switches 32, requiring cumbersome, error-prone and costly cabling work. Moreover, such installation by cabling results in fixed connections which can generally not be changed remotely. It follows that the conventional approach of adding and dropping signals on WDM channels has a limited degree of flexibility which can impair or even disable options to implement and re-configure network management functionalities, such as for example optical channel protection and/or bridge and role functionalities.

SUMMARY OF THE INVENTION

Accordingly, a problem underlying the present invention is to provide devices and methods for adding and dropping signals in a node of an optical network in a flexible and robust manner. In particular, it is desirable that such devices and methods require low installation efforts and can offer improved degree of flexibility for providing optical channel protection and bridge and role functionalities.

This problem is solved by a reconfigurable optical add-drop multiplexer (ROADM) for managing optical signals in a wavelength-division multiplexing (WDM) network according to claim 1 and by a method of managing signals in a reconfigurable optical add-drop multiplexer (ROADM) according to claim 14. Preferable embodiments are defined in the dependent claims.

The reconfigurable optical add-drop multiplexer (ROADM) according to the present invention comprises:
- a plurality of output ports, each connectable to an optical fiber of the network and adapted to transmit a wavelength-division multiplexing (WDM) optical signal via the corresponding optical fiber,
- at least one add port connectable to at least one line interface of the network and adapted to receive a modulated optical signal from the line interface,
- a plurality of selection units each comprising a plurality of selection unit output terminals, wherein each selection unit is connected to one of said add ports and adapted to select and use a selection unit output terminal to output the optical signal received from the add port,
- a plurality of broadcast units connected to selection unit output terminals of said plurality of selection units, wherein each of the broadcast units comprises a plurality of broadcast unit output terminals, the broadcast units being adapted to receive at least one of said optical signals outputted by said selection units, and to broadcast the received at least one optical signal via a plurality of said broadcast unit output terminals, and
- a multiplexing and selecting device or apparatus connected to broadcast unit output terminals of said plurality of broadcast units and adapted to select and multiplex optical signals broadcast via said broadcast unit output terminals into a plurality of wavelength-division multiplexing (WDM) optical signals and to forward the wavelength-division multiplexing (WDM) optical signals to output ports of the reconfigurable optical add-drop multiplexer (ROADM).

Hence, the present invention provides an improved reconfigurable optical add-drop multiplexer (ROADM) for managing optical signals in a wavelength-division multiplexing (WDM) network. In this respect, the term "add-drop" shall have a broad meaning and generally refer to any type of extracting a signal from or inserting a signal into a wavelength-division multiplexing (WDM) channel Here, the wavelength-division multiplexing (WDM) channels represent wavelength slots of optical signals carried by optical fibers which are connected to the network node including the reconfigurable optical add-drop multiplexer (ROADM). In this regard, the optical add-drop multiplexer (ROADM) comprises a plurality of output ports, each connectable to an optical fiber of the network and adapted to transmit a wavelength-division multiplexing (WDM) optical signal via the corresponding optical fiber. The optical fibers represent paths of communication connecting the same or different nodes in the optical network. For example, two or more of the output ports of the optical add-drop multiplexer (ROADM) may be connectable to two different fibers providing connectivity to two different nodes of the optical network.

For the purpose of adding signals, the optical add-drop multiplexer (ROADM) according to the present invention comprises at least one add port. Each of the add ports is connectable to at least one line interface of the optical network and adapted to receive a modulated optical signal from the line interface. In the present disclosure, the term "line interface" shall refer to any type of interface providing the at least one add port with an optical signal carrier. For example, the "line interface" may be part of a transponder, optical regenerator, electrical cross-connector or router, to name a few examples. Also in this respect, the line interface may provide a single-carrier or multi-carrier interface and may for example provide connectivity between the at least one add port and optical splitter/combiner units arranged externally to the optical add-drop multiplexer (ROADM). Further, the receiver of an optical interface may be adapted to select individual channels of a received optical multi-carrier signal and thus provide a channel selective interface to the at least one add port of the optical add-drop multiplexer (ROADM).

The optical add-drop multiplexer (ROADM) further comprises a plurality of selection units. Each of the selection units is connected to one of said add ports and adapted to forward the signal received from the respective add port to a selected output terminal of the selection unit. Thus, each selection unit comprises a plurality of selection unit output terminals and performs a switching function by forwarding the signal received from one of the add ports to a selected output of the selection unit.

In this respect, the signals outputted by the selection units are forwarded to a plurality of broadcast units. In other words, the optical add-drop multiplexer (ROADM) according to the present invention comprises a plurality of broadcast units which are connected to the selection unit output terminals of the selection units. Each of the broadcast units comprises a plurality of broadcast unit output terminals and is adapted to broadcast the at least one optical signal received from the at least one selection unit. It follows that each of the broadcast units receives at least one of the optical signals outputted by the selection units, and broadcasts each of the received signals via a plurality of output terminals of the broadcast unit. Hence, the term "broadcast" shall have a broad meaning and generally refer to duplicating the received at least one signal, and forwarding the duplicated two or more signals to a plurality of output terminals of the broadcast unit.

For example, the broadcast units may comprise an optical star coupler. In this preferred embodiment of the invention, the optical star coupler may comprise a plurality of input terminals and may be adapted to distribute each optical signal received at an input terminal to at least a subset, preferably all broadcast unit output terminals of the broadcast unit.

In a different embodiment of the present invention, each of the broadcast units may comprise a combiner connected to selection units and a splitter or star coupler connected to the broadcast output terminals of the broadcast unit. Thus, the combiner may be adapted to receive a plurality of optical signal at a plurality of its input terminals, to combine the received optical signals to a single optical signal, and to forward the single optical signal to a splitter or star coupler, either directly or via an optical amplifier. The respective splitter or star coupler may be adapted to distribute the combined optical signal to at least a subset, preferably all broadcast unit output terminals of the broadcast unit.

In any case, the broadcast units may be integrated in a single optical component, in particular to have at least one of said broadcast units and at least one of said selection units integrated into a single optical component.

The optical add-drop multiplexer (ROADM) according to the present invention may further comprise a multiplexing and selecting device or apparatus connected to broadcast unit output terminals of the broadcast units. The multiplexing and selecting device or apparatus is adapted to select and multiplex the optical signals received from the broadcast units into a plurality of wavelength-division multiplexed (WDM) optical signals. For this purpose, the multiplexing and selecting device or apparatus may for example comprise at least one wavelength-selective switch (WSS) and may be adapted to forward the wavelength-division multiplexed (WDM) optical signals to output ports of the reconfigurable optical add-drop multiplexer (ROADM), for example to provide optical channel protection or bridge and role functionalities.

In this way, rather than having conventional splitters duplicate the signals received at the input end of the optical add-drop multiplexer (ROADM) device, the broadcast units according to the present invention are adapted to broadcast optical signals via multiple paths at the output end of the optical add-drop multiplexer (ROADM). Consequently, the conventional splitters can be omitted from the input end of the arrangement which significantly reduces the number of components and simplifies the installation of the device. It follows that less cabling work is required to connect line interfaces to the optical add-drop multiplexer (ROADM), which in turn also enhances the flexibility of adapting the device to system or network requirement changes. Also, by having the broadcast unit distribute optical signals at the output end of the device, the broadcasting allows a transparent implementation of different channel protection or bridge and role schemes. More specifically, only the output end of the device requires adaption in order to duplicate and route optical signals via multiple paths, and does thus not require specific cabling at the input ports for implementing different routing of signals for each individual case. Moreover, if required, the broadcasting arrangement according to the present invention allows a transparent approach to broadcast the same signal to three or more outputs. This further enhances the flexibility of having bridge and role and channel protection schemes implemented with different number of channels carrying the duplicated and broadcast signals.

In an embodiment of the invention, the reconfigurable optical add-drop multiplexer (ROADM) may comprise at least $N_O \cdot (N_O-1)/2$ broadcast units, wherein $N_O$ is the number of output ports of the reconfigurable optical add-drop multiplexer (ROADM) connected to broadcast unit output terminals of said broadcast units. Here, each of the broadcast units may comprise at least two broadcast unit output terminals which are connected to at least two output ports of the reconfigurable optical add-drop multiplexer (ROADM). In this way, the selected number of broadcast units allows allocating duplicated signals to the respective output ports of the reconfigurable optical add-drop multiplexer (ROADM) in a very flexible manner, in particular in any possible combination thereof.

Similarly, the reconfigurable optical add-drop multiplexer (ROADM) according to the present invention may comprise at least $N_O$ broadcast units, wherein $N_O$ is the number of output ports of the reconfigurable optical add-drop multiplexer (ROADM) connected to broadcast unit output terminals of said broadcast units. Here, it is preferred that each of said broadcast units comprises at least $N_O-1$ broadcast unit output terminals connected to $N_O-1$ output ports of the reconfigurable optical add-drop multiplexer (ROADM). This is particular advantageous to reduce the number of device components, which in turn simplifies the device, lowers manufacturing costs and provides a more robust device less prone to component failure.

Similarly, the reconfigurable optical add-drop multiplexer (ROADM) according to the present invention may comprise at least one and up to ($N_O-1$) broadcast units with at least $N_O$ output ports, wherein $N_O$ is the number of output ports of the reconfigurable optical add-drop multiplexer (ROADM) connected to broadcast unit output terminals of said broadcast units. Here, it is preferred that each of said at least one broadcast unit comprises at least $N_O$ broadcast unit output terminals connected to $N_O$ output ports of the reconfigurable optical add-drop multiplexer (ROADM). This is particular advantageous to reduce the number of device components, which in turn simplifies the device, lowers manufacturing costs and provides a more robust device less prone to component failure.

In an embodiment of the invention, the reconfigurable optical add-drop multiplexer (ROADM) may further comprise:
- a plurality of input ports, each connectable to an optical fiber of the network and adapted to receive a wavelength-division multiplexed (WDM) optical signal carried on the corresponding optical fiber,
- at least one drop port, each connectable to at least one line interface and adapted to transmit a modulated optical signal to the at least one line interface, and
- a demultiplexing and switching device or apparatus connected to input ports of the reconfigurable optical add-drop multiplexer (ROADM), adapted to demultiplex wavelength-division multiplexed (WDM) optical signals received from said input ports into a plurality of modulated optical signals, and to select and convey said modulated optical signals to the drop ports.

In this way, the reconfigurable optical add-drop multiplexer (ROADM) provides a signal path for dropping signals to the at least one line interface. In this respect, the demultiplexing and switching device or apparatus may further comprise at least one wavelength-selective switch (WSS) or optical splitter connected to an input port of said reconfigurable optical add-drop multiplexer (ROADM) in order to efficiently demultiplex the wavelength-division multiplexing (WDM) optical signals received from said input port into a plurality of modulated optical signals, and to select and convey said modulated optical signals to the drop ports of the reconfigurable optical add-drop multiplexer (ROADM).

In an embodiment, the reconfigurable optical add-drop multiplexer (ROADM) according to the present invention may be adapted to provide colorless, directionless and/or contentionless add/drop capabilities, in order to further enhance the add-drop functionalities and flexibility of the reconfigurable optical add-drop multiplexer (ROADM).

The method of managing signals in a reconfigurable optical add-drop multiplexer (ROADM) of a wavelength-division multiplexing (WDM) network in accordance with the present invention comprises the steps of:

receiving wavelength-division multiplexing (WDM) optical signals carried on at least one optical fiber connected to the reconfigurable optical add-drop multiplexer (ROADM), receiving at each of a plurality of add ports of the reconfigurable optical add-drop multiplexer (ROADM) a modulated optical signal, wherein at least one of the add ports is connected to a line interface, selecting a broadcast unit of the reconfigurable optical add-drop multiplexer (ROADM) for each of the received modulated optical signals, conveying each of the received modulated optical signals to the corresponding selected broadcast unit, broadcasting the optical signals received by each of the broadcast units via a plurality of output terminals of each of the broadcast units, selecting and combining optical signals which are broadcast via said output terminals of the plurality of broadcast units into a plurality of wavelength-division multiplexing (WDM) optical signals, and routing said combined wavelength-division multiplexed (WDM) optical signals to at least one of optical fibers connected to the reconfigurable optical add-drop multiplexer (ROADM).

Hence, the present invention provides a method of managing signals in a reconfigurable optical add-drop multiplexer (ROADM) of a wavelength-division multiplexing (WDM) network. For the purpose of adding signals, the method according to the present invention comprises the step of receiving wavelength-division multiplexed (WDM) optical signals carried on at least one of optical fibers connected to the reconfigurable optical add-drop multiplexer (ROADM). Further, the method comprises the step of receiving at each of a plurality of add ports of the reconfigurable optical add-drop multiplexer (ROADM) a modulated optical signal, wherein at least one of the add ports is connected to a line interface. Thus, modulated optical signals received from add ports are added to wavelength-division multiplexing (WDM) optical signals carried on at least one of optical fibers connected to the reconfigurable optical add-drop multiplexer (ROADM).

In this respect, the method of managing signals in accordance with the present invention comprises the step of selecting a broadcast unit of the reconfigurable optical add-drop multiplexer (ROADM) for each of the received modulated optical signals; and the step of conveying the received modulated optical signals to their respective selected broadcast units. Hence, the method provides a switching function in order to have each of the received modulated optical signals forwarded to a selected broadcast unit. Further, the method comprises the additional step of broadcasting the received optical signals via a plurality of output terminals of each of the respective selected broadcast units. Hence, the step of broadcasting refers to duplicating received at least one optical signal, and forwarding the same to a plurality of output terminals of the respective selected broadcast units.

Then, the broadcasted optical signals are selected and combined into a plurality of wavelength-division multiplexed (WDM) optical signals; and the respective wavelength-division multiplexed (WDM) optical signals are then routed to at least one of optical fibers connected to the reconfigurable optical add-drop multiplexer (ROADM). In other words, a selection of the broadcasted optical signals is made and then combined into a plurality of wavelength-division multiplexed (WDM) optical signals. It follows that the formed wavelength-division multiplexed (WDM) optical signals include modulated optical signals received from the add ports of the reconfigurable optical add-drop multiplexer (ROADM). Consequently, routing the so formed wavelength-division multiplexed (WDM) optical signals to optical fibers connected to the reconfigurable optical add-drop multiplexer (ROADM) completes the respective functionality of adding modulated optical signals received from add ports to wavelength-division multiplexing (WDM) optical signals carried on at least one of optical fibers connected to the reconfigurable optical add-drop multiplexer (ROADM). In an embodiment of the invention, the combined wavelength-division multiplexing (WDM) optical signal is routed to a plurality of output ports of the reconfigurable optical add-drop multiplexer (ROADM).

In this way, rather than duplicating the modulated optical signals directly after receipt at the add ports, the method according to the present invention forwards the modulated optical signals to selected broadcast units, and then broadcasts the signals via multiple paths closer to the output end of the optical add-drop multiplexer (ROADM). Consequently, the present invention requires no splitting or duplication of optical signals at the input end of the optical add-drop multiplexer (ROADM), and thus provides a simplified approach which can be performed by a reduced number of device components. Since the number of device components is reduced, the device is simplified, manufacturing costs are lowered and a more robust device less prone to component failure is provided. Moreover, as mentioned above, by having the broadcast unit distribute optical signals at the output end of the device, the broadcasting allows a transparent implementation of different channel protection or bridge and role schemes. More specifically, only the output end of the device requires adaption in order to duplicate and route optical signals via multiple paths without requiring specific cabling at the input ports for implementing different routing of signals for each individual case. Also, if required, the broadcasting according to the present invention allows a transparent approach to broadcast the same signal to three or more outputs, for example to enhance the flexibility of implementing bridge and role and channel protection schemes.

SHORT DESCRIPTION OF THE FIGURES

Figure 2:
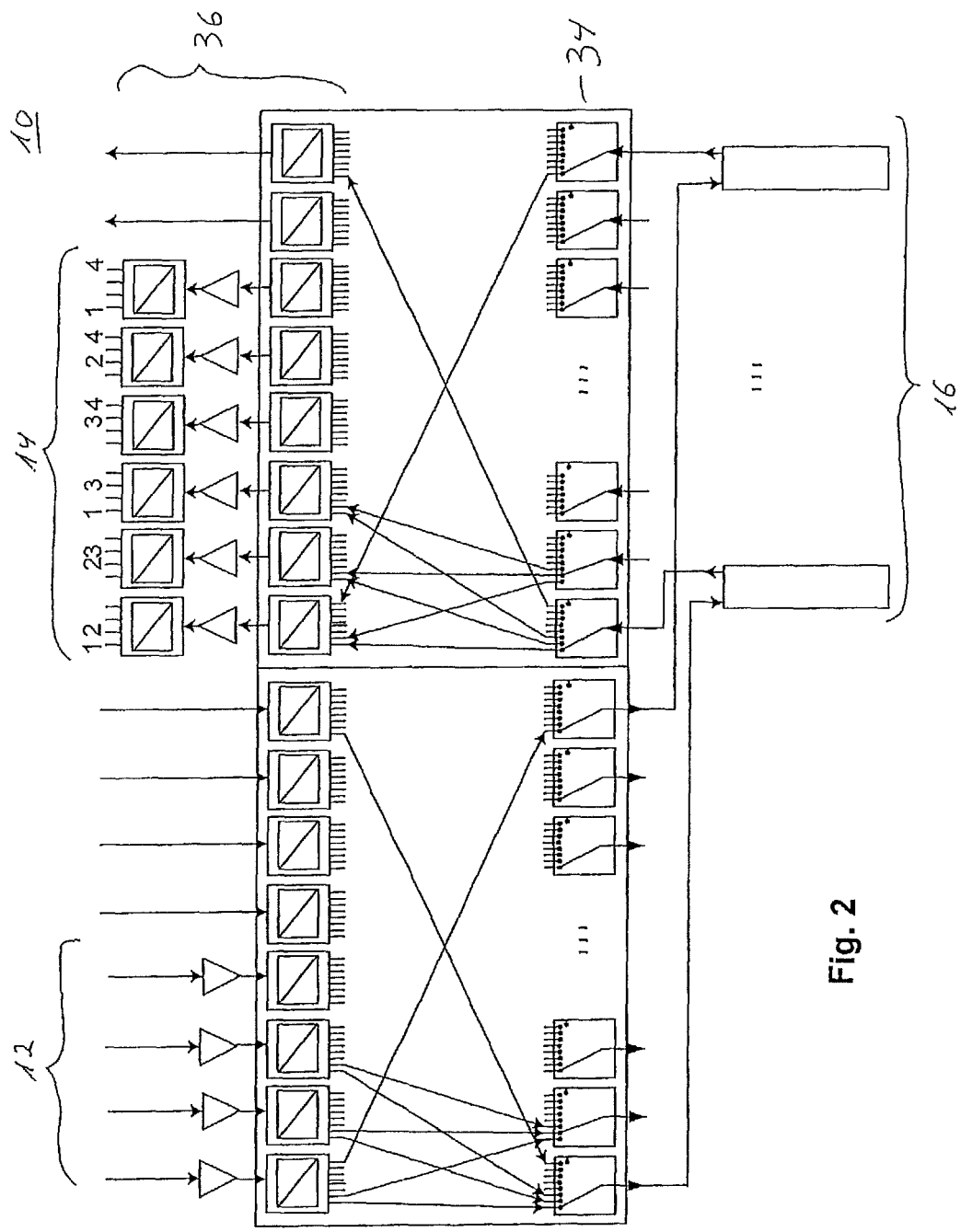
Figure 3:
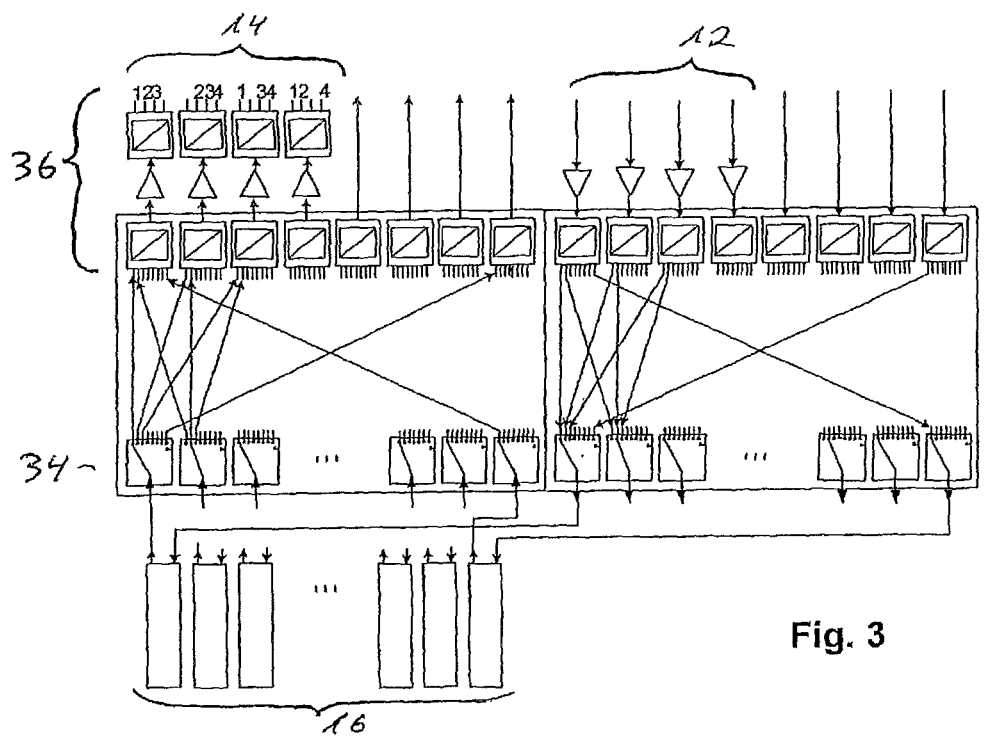
Figure 4:
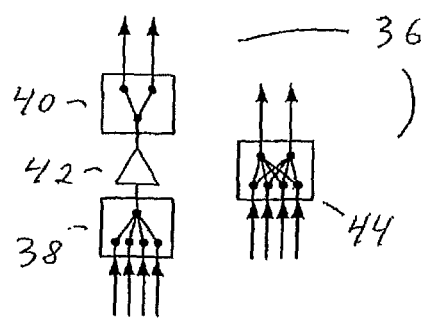
Figure 5:
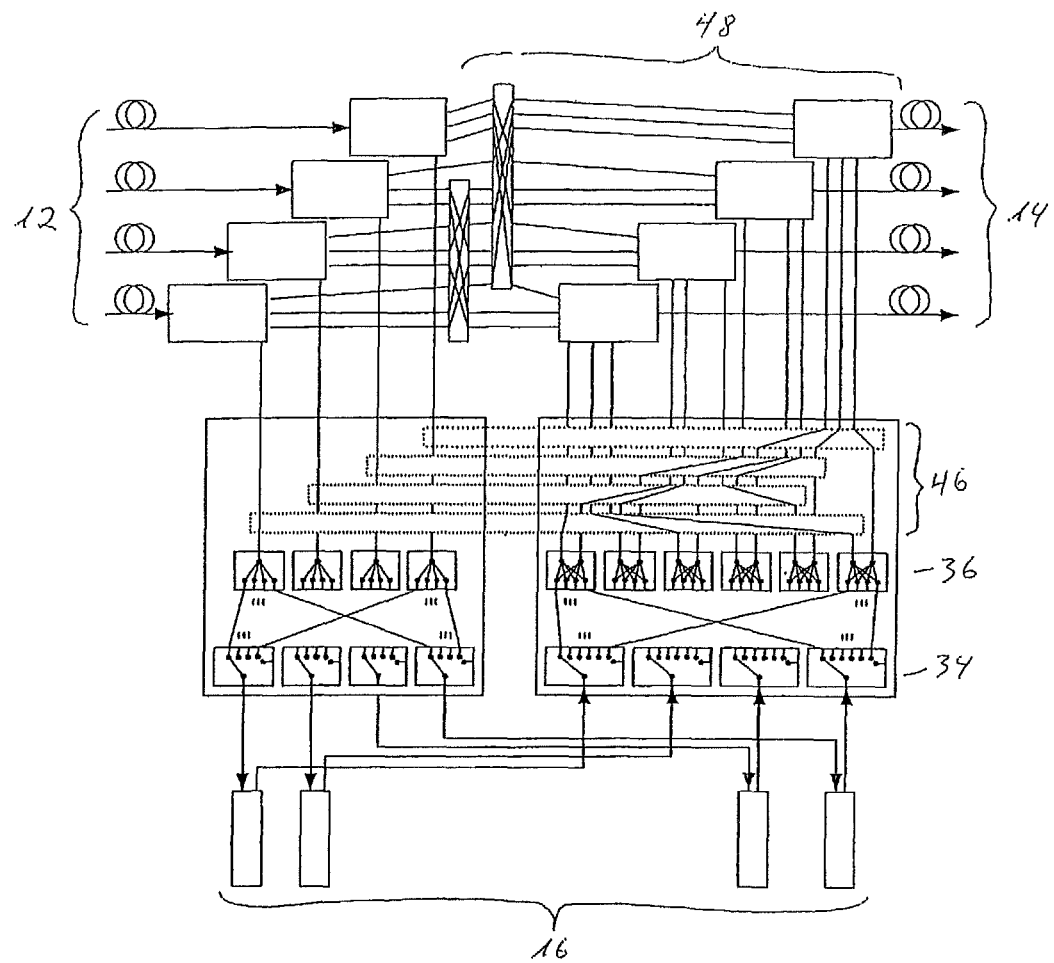
Figure 6:
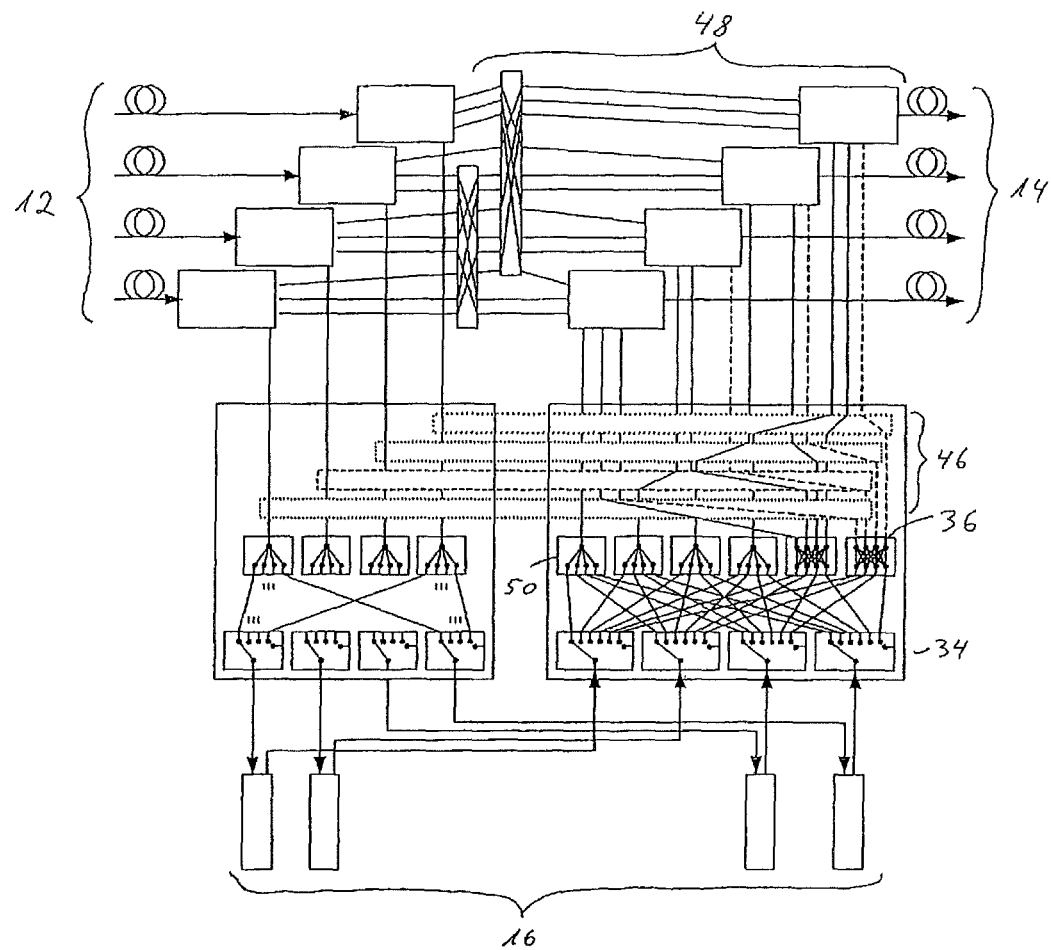
Figure 7:
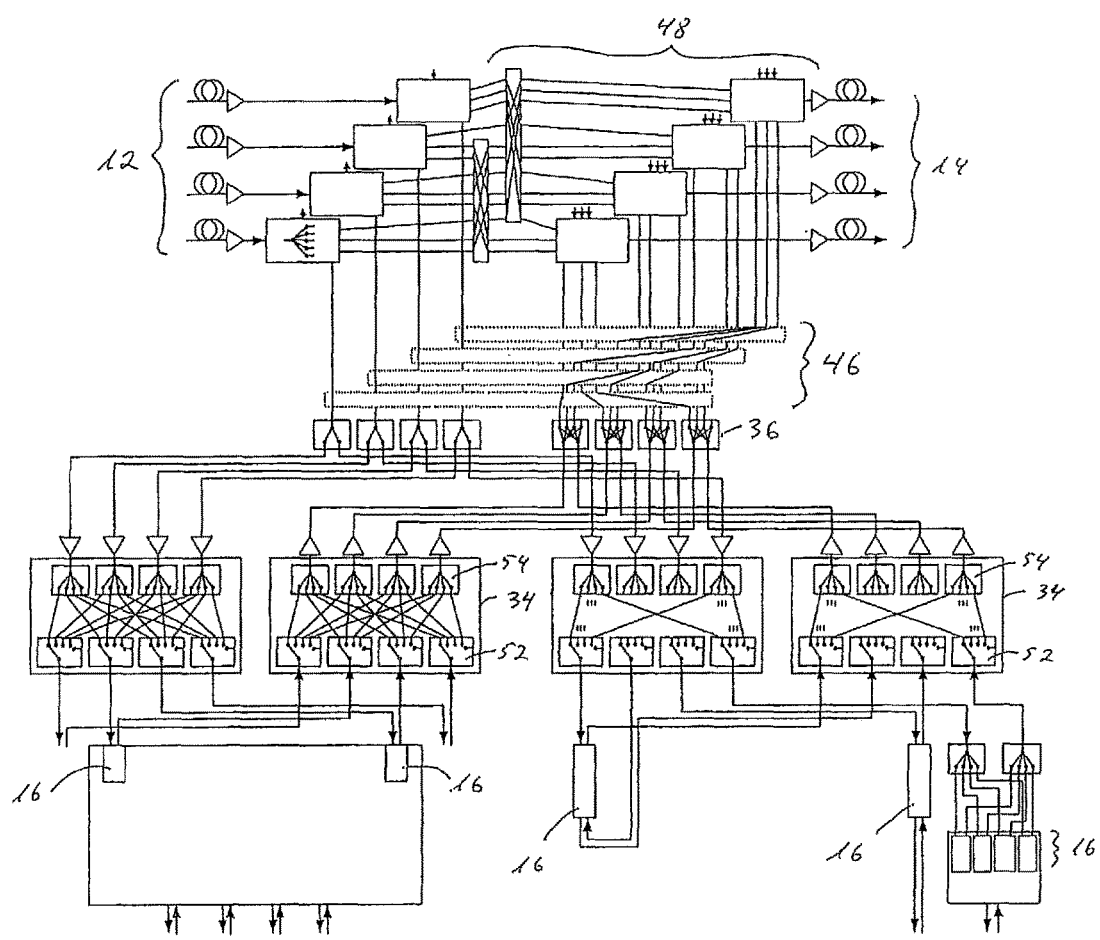

FIG. 1 illustrates a conventional optical add-drop multiplexer (ROADM) with two port switch/splitter optical channel protection units, FIG. 2 illustrates an optical add-drop multiplexer (ROADM) according to the present invention comprising 1×2 broadcast units at the outputs of combiner units, FIG. 3 illustrates an optical add-drop multiplexer (ROADM) according to the present invention comprising 1×3 broadcast units at the outputs of combiner units, FIG. 4 illustrates two different embodiments of a broadcast unit, FIG. 5 illustrates an optical add-drop multiplexer (ROADM) according to the present invention including a multiplexing and selecting device or apparatus and further including broadcast units comprising star couplers, FIG. 6 illustrates an optical add-drop multiplexer (ROADM) according to the present invention including broadcast units comprising star couplers arranged in parallel to combiner units, FIG. 7 illustrates an optical add-drop multiplexer (ROADM) according to the present invention including selection units having switching and combining functionalities.

DESCRIPTION OF THE PREFERRED EMBODIMENTS

For the purposes of promoting an understanding of the principles of the invention, reference will now be made to the preferred embodiments illustrated in the drawings and specific language will be used to describe the same. It will nevertheless be understood that no limitation of the scope of the invention is thereby intended. Alterations and further modifications of the illustrated devices and of the method as well as further application of the principles of the invention as illustrated therein are being contemplated and would normally occur now or in the future to one skilled in the art to which the invention relates and who has studied the following detailed disclosure.

FIG. 2 is a schematic illustration of a reconfigurable optical add/drop multiplexer (ROADM) 10 according to the present invention. Here, optical channel protection is provided by colorless, directionless and contentionless adding and dropping of signals on four incoming 12 and outgoing fiber 14 connections. Sixteen optical line interfaces 16 are provided to transmit and receive signals to be added and dropped at the node. The signals from the optical line interfaces 16 to be added are fed to selection units 34. In this embodiment of the invention, the selection units 34 represent switches which forward each of the signals to selected broadcast units 36. Each of the broadcast units 36 comprises three components, namely two couplers 38, 40 and an amplifier 42 as illustrated in the embodiment of a broadcast unit 36 shown on the left in FIG. 4. In other words, each of the broadcast units 36 is adapted to have the first coupler 38 receive and combine at least one of the optical signals received from the selection units 34 into a single optical signal. In this embodiment of the invention, the single optical signal is forwarded to an amplifier 42, although the amplifier stage may be omitted if the underlying optical signal powers are sufficient and require no further amplification. Then, the amplified single optical signal is forwarded to the second coupler 40 which is adapted to distribute the amplified optical signal to two output terminals of the broadcast unit 36. As illustrated in FIG. 2, the output terminals of the broadcast units 36 are each connected to different pairs of four (1, 2, 3, 4) outgoing fibers 14 shown in FIG. 5. Thus, by having the selection unit 34 select a broadcast unit 36 for broadcasting an optical signal, the respective selection determines which pair of the outgoing fibers 14 shall carry the "working" and "protection" signal paths for providing optical channel protection. To accomplish the respective free pre-configuration of one of the available six working and protection path pairs in a 4 degree ROADM (1&2, 2&3, 1&3, 3&4, 2&4, 1&4), six broadcast units 36 are in place and provide twelve interconnections to the connecting device or apparatus 46, selecting and multiplexing device or apparatus 48 and outgoing fibers 14 as illustrated in FIG. 5.

Similarly, FIG. 3 illustrates a reconfigurable optical add/drop multiplexer (ROADM) 10 according to the present invention which corresponds to the arrangement given in FIG. 2, but with the difference that the output terminals of the broadcast units 36 are each connected to different constellations of three out of four (1, 2, 3, 4) outgoing fibers 14 shown in e.g. FIG. 7. Thus, by having the selection unit 34 select a broadcast unit 36 for broadcasting an optical signal, the respective selection determines which of the three outgoing fibers 14 shall carry the "working" and "protection" signal paths for providing optical channel protection. To accomplish the respective free pre-configuration of one of the available six working and protection path pairs in a 4 degree ROADM (1&2, 2&3, 1&3, 3&4, 2&4, 1&4), four broadcast units 36 are in place, each having three output ports used to provide in total the twelve interconnections to the connecting device or apparatus 46, selecting and multiplexing device or apparatus 48 and outgoing fibers 14 as explained in conjunction with FIG. 7. By having the broadcasted optical signals carried by three or more outgoing fibers, the redundancy of the optical channel protection can be enhanced. Alternatively, the respective three or more "working" and "protection" signal paths may be subject to further selection of paths, for example by selecting two out of three "working" and "protection" signal paths in a not shown selection device or apparatus connected to outputs of the broadcast units 36. In this way, the flexibility of selecting and providing a reconfigurable optical add/drop multiplexer (ROADM) 10 can be even further enhanced in accordance with the present invention.

Moreover, as already mentioned above, the reconfigurable optical add/drop multiplexer (ROADM) 10 according the embodiments in FIGS. 2 and 3 obviates the need of applying conventional splitters 18 (see FIG. 1) to duplicate signals received at the input end of the optical add-drop multiplexer (ROADM) 10. The broadcast units 36 according to the embodiment of the present invention are instead adapted to broadcast optical signals via multiple paths at the output end of the optical add-drop multiplexer (ROADM) 10. Hence, the conventional splitters 18 are not used and can be omitted from the input end of the arrangement which significantly reduces the number of components and simplifies the installation of the device. It also follows that less cabling work is required to connect line interfaces to the optical add-drop multiplexer (ROADM), which in turn also enhances the flexibility of adapting the device to system changes or requirements. Also, by having the broadcast units 36 distribute optical signals at the output end of the device, the broadcasting allows a transparent implementation of different channel protection or bridge and role schemes. More specifically, only the output end of the device requires adaption in order to duplicate and route optical signals via multiple paths, thus without requiring specific cabling at the input ports to implement different routing of signals for each individual case.

As mentioned above, FIG. 4 illustrates on the left a broadcast unit 36 comprising three components, namely two couplers 38, 40 and an amplifier 42. FIG. 4 illustrates on the right a further embodiment of the broadcast unit 36 comprising a star coupler 44 having four input ports and two output ports. FIG. 5 illustrates a corresponding reconfigurable optical add/drop multiplexer (ROADM) 10 according to another embodiment of the present invention, wherein the broadcast units shown in FIG. 2 have been replaced with broadcast units comprising the star coupler 44 illustrated in FIG. 4. Moreover, in FIG. 5, the broadcast units 36 are arranged to receive optical signals outputted by the selection units 34 and to broadcast the same via two output ports to a connecting device or apparatus 46, which also applies for the arrangements illustrated in FIGS. 2 and 3. Thus, FIG. 5 shows how the broadcasted signals output by the broadcast units 36 are fed to a connecting device or apparatus 46 which is adapted to forward the broadcast signals to a multiplexing device or apparatus 48. In this regard, the connecting, selecting and multiplexing devices or apparatuses 46, 48 represent a combined layer adapted to connect and multiplex the optical signals received from the broadcast units 36 into a plurality of wavelength-division multiplexed (WDM) optical signals. For this purpose, the connecting, selecting and multiplexing devices or apparatuses 46, 48 may for example comprise one or more types of switches, in particular at least one wavelength-selective switch (WSS). As illustrated in FIG. 5, the connecting, selecting and multiplexing devices or apparatuses 46, 48 are adapted to forward the wavelength-division multiplexed (WDM) optical signals to output ports connected to the outgoing fibers 14, for example to provide optical channel protection and/or bridge and role functionalities. It follows that the connecting, selecting and multiplexing devices or apparatuses 46, 48 include additional means for providing a reconfigurable optical add/drop multiplexer (ROADM) 10 with enhanced flexibility to select and multiplex signals at the output end of the device. Moreover, in addition to the enhanced flexibility, the reconfigurable optical add/drop multiplexer (ROADM) 10 shown in FIG. 5 requires only a relatively low number of components and has a low system complexity.

For example, FIG. 6 illustrates how the reconfigurable optical add/drop multiplexer (ROADM) 10 according to the present invention can be adapted to comprise star couplers representing at least one broadcast unit 36 with four input ports and four output ports which are arranged in parallel to combiner units 50. The combiner units 50 combine the signals received at four input ports of the combiner units to provide single output signals. The output signals of the combiner units 50 and the at least one broadcast unit 36 are then forwarded to connecting, selecting and multiplexing devices or apparatuses 46, 48 already explained above with reference to FIG. 5. Thus, in the embodiment according to FIG. 6, the selection units 34 determine whether optical signals received from the line interfaces 16 shall be subject to broadcasting via the broadcast units 36 or not. Hence, the selection units 34 may determine that optical signals received from the line interfaces 16 shall be forwarded to the selecting and multiplexing device or apparatus 46, 48 via combiner units 50 without being duplicated to a plurality of signal paths. In other words, the present invention provides efficient and flexible means for adjusting and/or configuring optical add/drop multiplexers (ROADM) 10 such as to define and apply channel protection to a selected set of added optical signals received from the line interfaces 16. To accomplish the respective free pre-configuration of one of the available six working and protection path pairs in a 4 degree ROADM (1&2, 2&3, 1&3, 3&4, 2&4, 1&4) for a first channel, one broadcast unit 36 are in place and connected to provide four interconnections to the connecting device or apparatus 46, selecting and multiplexing device or apparatus 48 and outgoing fibers 14. A further channel may or may not need a second broadcast unit as shown to be connected to the connecting device or apparatus 46, multiplexing and selecting device or apparatus 48 and outgoing fibers 14. To accomplish the respective free pre-configuration of one of the available six working and protection path pairs in a 4 degree ROADM (1&2, 2&3, 1&3, 3&4, 2&4, 1&4), three broadcast units 36 and twelve interconnections to the connecting device or apparatus 46, selecting and multiplexing device or apparatus 48 and outgoing fibers 14 can be provided.

FIG. 7 illustrates a further embodiment of the present invention wherein the selection units 34 comprise a number of switching units 52 and combiner units 54 arranged to forward optical signals received from line interfaces 16 to selected broadcasting units 36. Thus, according to the present invention, the selection units 34 may be adapted to receive signals from optical line interfaces in many different ways, wherein the line interfaces may for example represent part of a transponder, optical regenerator, electrical cross-connector or router, to name a few examples. Moreover, as illustrated in FIG. 7 the optical line interfaces 16 may require the selection units 34 to comprise switching and combining functionalities, for example in order to enable a multi-carrier signal interface and multi-carrier signal connectivity to the broadcast units 36. Thus, the optical signals received from the line interfaces 16 may each have a single wavelength or may represent multi-carrier signals. In the latter case of multi-carrier signals, the receiver of the optical interface 16 may for example be adapted to comprise selection units to select individual channels of an multi-carrier signals optical received by the line interfaces. FIG. 7 shows in addition an amplifier per incoming fiber 12 and per outgoing fiber 14.

In this way, the selection units 34 according to the present invention provide the functionality required to collect optical signals from different layers, devices or components, wherein the different layers, devices or components comprise line interfaces 16 of the optical network. Further, the selection units 34 according to the present invention may combine and/or generate multi-carrier signals for broadcasting the same via broadcast units 36, for example in order to enable channel protection or bridge and role functionalities. In any case, the broadcast units 36 according to the present invention distribute optical signals at the output end of the device and thus allow an efficient and transparent implementation of different channel protection or bridge and role schemes.

The embodiments described above and the accompanying figures merely serve to illustrate the method and devices according to the present invention, and should not be taken to indicate any limitation thereof. The scope of the present invention is solely determined by the following claims.

LIST OF REFERENCE SIGNS 10 reconfigurable optical add/drop multiplexer (ROADM)
12 incoming fiber connections
14 outgoing fiber connections
16 optical line interfaces
18, 28 splitters
20, 30, 32 switches
22, 50, 54 combiner units
24, 26 amplifier stages
32 first output port
34 selection units
36 broadcast units
38, 40 couplers 42 amplifiers
44 star coupler
46 selecting device or apparatus
48 multiplexing device or apparatus
52 switching units

The invention claimed is:

1. A reconfigurable optical add-drop multiplexer (ROADM) for managing optical signals in a wavelength-division multiplexing (WDM) network, comprising:
a plurality of output ports, each connectable to an optical fiber of the network and adapted to transmit a WDM optical signal via a corresponding optical fiber,
a plurality of input ports, each connectable to an optical fiber of the network and adapted to receive a WDM optical signal carried on a corresponding optical fiber,
at least one add port connectable to at least one line interface of the network and each add port of the at least one add port adapted to receive a modulated optical signal from a respective line interface of the at least one line interface,
at least one drop port, each connectable to at least one line interface and adapted to transmit a modulated optical signal to a respective line interface, to which the at least one drop port is connectable,
a plurality of selection units each comprising a plurality of selection unit output terminals, wherein each selection unit is connected to at least one of said at least one add port and adapted to select and use a selection unit output terminal to output an optical signal received from the add port to which the selection unit is connected,
at least No·(No−1)/2 of broadcast units connected to selection unit output terminals of said plurality of selection units, wherein each of the broadcast units comprises a plurality of broadcast unit output terminals, each broadcast unit being adapted to receive at least one optical signal outputted by said selection units, and to broadcast the received at least one optical signal via a plurality of said broadcast unit output terminals, the number of broadcast unit output terminals of said plurality of broadcast unit output terminals being smaller than the number of output ports of said plurality of output ports;
a multiplexing and selecting device or apparatus connected to broadcast unit output terminals of said broadcast units and adapted to select and multiplex optical signals broadcast via said broadcast unit output terminals into a plurality of WDM optical signals and to forward the WDM optical signals to output ports of the ROADM, wherein No is the number of output ports of the ROADM connected to broadcast unit output terminals of said broadcast units, wherein the broadcast unit output terminals of each of the No·(No−1)/2 broadcast units are connected to different constellations of said plurality of output ports, wherein No is at least 4, and
a broadcasting and switching device or apparatus connected to input ports of the ROADM, adapted to broadcast WDM optical signals received from said input ports into a plurality of modulated optical signals, and to select and convey said modulated optical signals to the at least one drop port.

2. The ROADM of claim 1, wherein at least one of the broadcast units is an optical star coupler comprising a plurality of input terminals and adapted to distribute each optical signal received via the input terminals to at least a subset of all broadcast unit output terminals of the broadcast unit.

3. The ROADM of claim 1, wherein at least one of the broadcast units comprises a combiner connected to said selection units and a splitter or star coupler connected to the broadcast unit output terminals of the broadcast unit, and wherein the combiner is connected to the splitter or star coupler.

4. The ROADM of claim 3, wherein the at least one of the broadcast units further comprises an optical amplifier adapted to receive an optical signal from the combiner, and wherein the splitter or star coupler and combiner are connected via the optical amplifier.

5. The ROADM of claim 1, wherein at least one of said broadcast units is integrated in a single optical component, in particular wherein at least one of said broadcast units and at least one of said selection units is integrated into a single optical component.

6. The ROADM of claim 1, wherein the multiplexing and selecting device or apparatus comprises at least one wavelength-selective switch (WSS).

7. The ROADM of claim 1, wherein the multiplexing and selecting device or apparatus is adapted to forward the optical signals broadcasted by one of the broadcast units to a plurality of output ports of the ROADM.

8. The ROADM of claim 7, wherein the multiplexing and selecting device or apparatus is adapted to forward the optical signals broadcasted by one of the broadcast units to a plurality of output ports of the ROADM such as to provide optical channel protection or bridge and role functionality.

9. The ROADM of claim 1, wherein the broadcasting and switching device or apparatus further comprises at least one wavelength-selective switch (WSS) or optical splitter connected to an input port of said ROADM.

10. The ROADM of claim 1, said ROADM adapted to provide colorless, directionless and/or contentionless add/drop capabilities.

11. A method of managing signals in a reconfigurable optical add-drop multiplexer (ROADM) of a wavelength-division multiplexing (WDM) network, comprising the steps of:
receiving WDM optical signals carried on at least one incoming optical fiber connected to the ROADM,
receiving at each of at least one add port of the ROADM a modulated optical signal, wherein at least one add port is connected to a line interface,
selecting a broadcast unit from a plurality of broadcast units of the ROADM for each of received modulated optical signals,
conveying each of the received modulated optical signals to a corresponding selected broadcast unit,
broadcasting the modulated optical signals received by each of the broadcast units via a plurality of output terminals of each of the broadcast units,
selecting and combining optical signals which are broadcast via said output terminals of the plurality of broadcast units into a plurality of WDM optical signals, and
routing each of said WDM optical signals to a plurality of outgoing optical fibers connected to the ROADM, the number of optical fibers of said plurality of outgoing optical fibers being No and the number of broadcast units being No·(No−1)/2, wherein the output terminals of each of the broadcast units are connected to different constellations of said plurality of outgoing optical fibers, wherein No is at least 4; and
wherein the number of output terminals of said plurality of output terminals is smaller than the number of optical fibers of said plurality of outgoing optical fibers, wherein optical signals broadcasted by one of the broadcast units are forwarded to a plurality of output ports of the ROADM such as to provide optical channel protection functionality.

\* \* \* \* \*